US011885918B2

(12) United States Patent
Coleman et al.

(10) Patent No.: US 11,885,918 B2
(45) Date of Patent: Jan. 30, 2024

(54) SONAR SYSTEM WITH DYNAMIC POWER STEERING

(71) Applicant: Garmin International, Inc., Olathe, KS (US)

(72) Inventors: Aaron R. Coleman, Broken Arrow, OK (US); Brian T. Maguire, Bixby, OK (US)

(73) Assignee: Garmin International, Inc., Olathe, KS (US)

(*) Notice: Subject to any disclaimer, the term of this patent is extended or adjusted under 35 U.S.C. 154(b) by 316 days.

(21) Appl. No.: 17/480,863

(22) Filed: Sep. 21, 2021

(65) Prior Publication Data

US 2022/0120882 A1    Apr. 21, 2022

Related U.S. Application Data

(60) Provisional application No. 63/093,370, filed on Oct. 19, 2020.

(51) Int. Cl.
*G01S 7/521* (2006.01)
*G01S 15/89* (2006.01)

(52) U.S. Cl.
CPC .............. *G01S 7/521* (2013.01); *G01S 15/89* (2013.01)

(58) Field of Classification Search
CPC .......... G01S 7/524; G01S 7/521; G01S 15/89; G01S 15/87; G01S 15/42; G01S 7/539;
(Continued)

(56) References Cited

U.S. PATENT DOCUMENTS 3,283,264 A    11/1966   Papadakis
3,540,544 A    11/1970   Karlson
(Continued)

FOREIGN PATENT DOCUMENTS

EP    0818679 A2    1/1998
GB    2083219 A     3/1982
(Continued)

OTHER PUBLICATIONS

Garmin Panoptix™ PS30; https://buy.garmin.com/en-US/US/p/149188 published prior to Sep. 29, 2016.
(Continued)

*Primary Examiner* — Daniel L Murphy
*Assistant Examiner* — Amie M Ndure
(74) *Attorney, Agent, or Firm* — Samuel M. Korte; Max M. Ali

(57) ABSTRACT

A sonar array system comprises a plurality of sonar arrays and a sonar signal processor. Each sonar array is configured to receive transmit electronic signals and transmit corresponding sonar beams in a forward direction and a downward direction. Each sonar array includes a plurality of groups of sonar transducer elements, with each group including at least a first sonar transducer element and a second sonar transducer element. The sonar signal processor is configured to communicate a plurality of transmit electronic signals to the sonar arrays. The transmit electronic signals include a first transmit electronic signal including a periodic waveform having a first phase and a second transmit electronic signal including a periodic waveform having a second phase. A distribution of power between the sonar beams transmitted in the forward direction and in the downward direction varies according to a difference in the first phase and the second phase.

20 Claims, 12 Drawing Sheets

(58) Field of Classification Search
CPC . G01S 15/96; H01L 25/16; H01L 2924/0002;
H01L 2224/48091; H01L 2924/19105
USPC ...................................... 367/104, 87, 98, 88
See application file for complete search history.

(56) References Cited

U.S. PATENT DOCUMENTS

| | | | |
|---|---|---|---|
| 4,011,747 | A | 3/1977 | John |
| 4,031,544 | A | 6/1977 | Lapetina |
| 4,069,468 | A | 1/1978 | Bartram |
| 4,121,190 | A | 10/1978 | Edgerton et al. |
| 4,199,746 | A | 4/1980 | Gilmour et al. |
| 4,329,876 | A | 5/1982 | Chen et al. |
| 4,389,110 | A | 6/1983 | Pizzuti |
| 4,398,421 | A | 8/1983 | White |
| 4,435,984 | A | 3/1984 | Gruber |
| 4,479,206 | A | 10/1984 | Granberg et al. |
| 4,635,484 | A | 1/1987 | Lerch |
| 4,907,208 | A | 3/1990 | Lowrance et al. |
| 4,982,924 | A | 1/1991 | Havins |
| 5,033,029 | A | 7/1991 | Jones |
| 5,091,892 | A | 2/1992 | Secretan |
| 5,311,781 | A | 5/1994 | Gates |
| 5,369,623 | A | 11/1994 | Zerangue |
| 5,805,528 | A | 9/1998 | Hamada et al. |
| 5,923,617 | A | 7/1999 | Thompson et al. |
| 7,542,376 | B1 | 6/2009 | Thompson et al. |
| 7,606,114 | B2 | 10/2009 | Bachelor et al. |
| 7,633,835 | B1 | 12/2009 | Erikson et al. |
| 7,889,600 | B2 | 2/2011 | Thompson et al. |
| 8,811,120 | B2 | 8/2014 | Bachelor et al. |
| RE45,379 | E | 2/2015 | Rowe |
| 8,964,507 | B2 | 2/2015 | Bachelor et al. |
| 9,459,350 | B2 | 10/2016 | Betts et al. |
| 10,310,062 | B2 | 6/2019 | Coleman et al. |
| 10,545,226 | B2 | 1/2020 | Wigh et al. |
| 10,890,660 | B2 | 1/2021 | Wigh et al. |
| 2003/0076742 | A1 | 4/2003 | Rowe |
| 2003/0214880 | A1 | 11/2003 | Rowe |
| 2005/0007880 | A1 | 1/2005 | Zimmerman et al. |
| 2005/0007882 | A1 | 1/2005 | Bachelor et al. |
| 2005/0154503 | A1 | 7/2005 | Jacobs |
| 2006/0028480 | A1 | 2/2006 | Engel |
| 2006/0072375 | A1* | 4/2006 | Nishimori ............... G01S 15/96 367/111 |
| 2007/0070814 | A1 | 3/2007 | Frodyma et al. |
| 2007/0078347 | A1 | 4/2007 | Srinivasan et al. |
| 2007/0291589 | A1* | 12/2007 | Kawabata ............... G01S 15/89 367/88 |
| 2008/0007142 | A1 | 1/2008 | Toda |
| 2008/0239870 | A1* | 10/2008 | Dubuis ................... G01S 15/89 367/21 |
| 2008/0247275 | A1 | 10/2008 | Dubuis et al. |
| 2010/0054084 | A1 | 3/2010 | Boucher et al. |
| 2010/0106431 | A1 | 4/2010 | Baba et al. |
| 2010/0226209 | A1* | 9/2010 | Johnson ................. G01S 15/89 367/106 |
| 2010/0256813 | A1 | 10/2010 | Chiappetta et al. |
| 2011/0013484 | A1 | 1/2011 | Coleman et al. |
| 2011/0013485 | A1 | 1/2011 | Maguire |
| 2012/0014220 | A1 | 1/2012 | DePasqua |
| 2013/0075193 | A1 | 3/2013 | Vavalle |
| 2013/0148471 | A1 | 6/2013 | Brown et al. |
| 2013/0208568 | A1 | 8/2013 | Coleman |
| 2014/0010049 | A1 | 1/2014 | Proctor |
| 2014/0092709 | A1 | 4/2014 | Miller et al. |
| 2014/0269164 | A1 | 9/2014 | Betts et al. |
| 2014/0269192 | A1* | 9/2014 | Proctor .................. G01S 15/96 29/592.1 |
| 2015/0168572 | A1 | 6/2015 | Bagaini et al. |
| 2016/0018514 | A1 | 1/2016 | Black et al. |
| 2016/0018516 | A1 | 1/2016 | Brown et al. |
| 2016/0047906 | A1 | 2/2016 | Matson et al. |
| 2016/0049143 | A1 | 2/2016 | Matson et al. |
| 2016/0131759 | A1 | 5/2016 | Kozuki |
| 2016/0259054 | A1 | 9/2016 | Proctor et al. |
| 2016/0341827 | A1 | 11/2016 | Horner et al. |
| 2016/0377716 | A1* | 12/2016 | Proctor ................. G01S 7/6245 367/88 |
| 2017/0090021 | A1 | 3/2017 | Sayer et al. |
| 2017/0146642 | A1 | 5/2017 | Stokes et al. |
| 2017/0164839 | A1 | 6/2017 | Kandori |
| 2017/0212230 | A1 | 7/2017 | Wigh et al. |
| 2018/0100922 | A1 | 4/2018 | Wigh et al. |
| 2018/0217244 | A1 | 8/2018 | Coleman et al. |
| 2019/0265340 | A1 | 8/2019 | Antao |
| 2020/0072953 | A1* | 3/2020 | Wigh ..................... G01S 15/89 |
| 2020/0158842 | A1 | 5/2020 | Wigh et al. |
| 2020/0256967 | A1* | 8/2020 | Wigh ..................... G01S 7/521 |
| 2021/0096244 | A1 | 4/2021 | Wigh et al. |
| 2023/0074053 | A1* | 3/2023 | Wigh ...................... G01S 7/60 |

FOREIGN PATENT DOCUMENTS

| | | |
|---|---|---|
| GB | 2114296 B | 8/1985 |
| JP | 6486083 A | 3/1989 |

OTHER PUBLICATIONS

Hummingbird, Installation and Operation manual 858c, pp. 1-150, 2010 (Year: 2010).
Printout from http://www.bbcboards.net/showthread.php?t=700823 published prior to Sep. 29, 2016.
Printout from http://www.ncbi.nlm.nih.gov/pmc/articles/PMC4703966/ ; published prior to Sep. 29, 2016.

* cited by examiner

SONAR SIGNAL PROCESSOR TRANSMIT ELECTRONIC SIGNAL WAVEFORMS WITH NO PHASE DIFFERENCE

SONAR ARRAY TRANSMISSION WITH EQUAL POWER DISTRIBUTION

SONAR SIGNAL PROCESSOR TRANSMIT ELECTRONIC SIGNAL WAVEFORMS WITH 25 DEGREE PHASE DIFFERENCE

SONAR ARRAY TRANSMISSION WITH A FIRST EXAMPLE OF REDUCED DOWNWARD POWER

SONAR SIGNAL PROCESSOR TRANSMIT ELECTRONIC SIGNAL
WAVEFORMS WITH 50 DEGREE PHASE DIFFERENCE
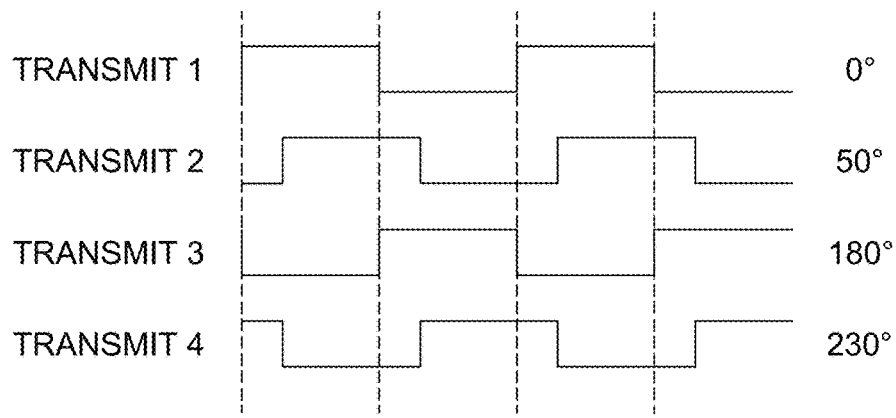
Fig. 8A.
SONAR ARRAY TRANSMISSION WITH A SECOND
EXAMPLE OF REDUCED DOWNWARD POWER
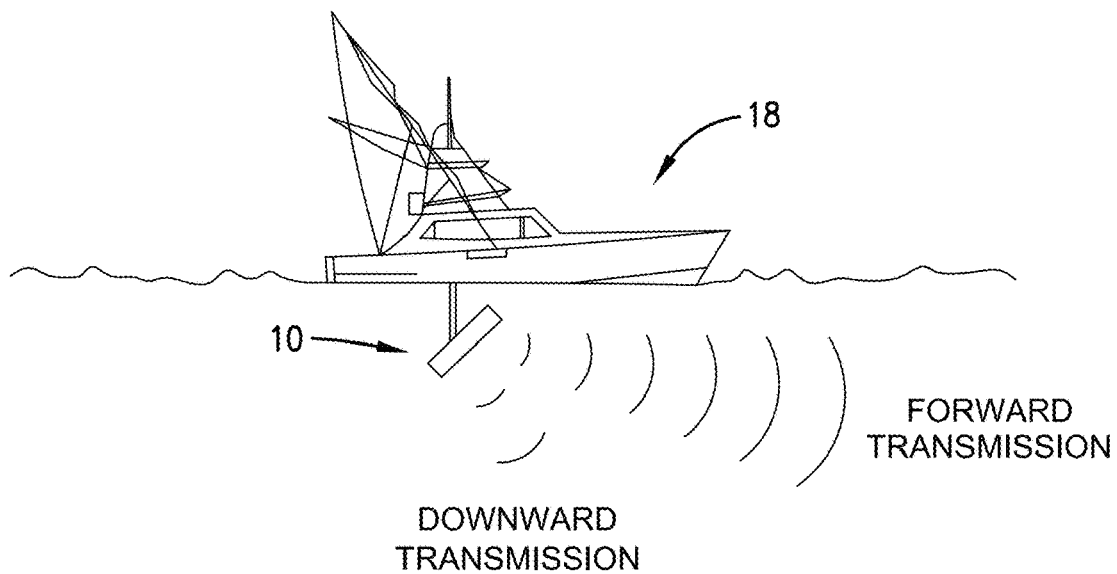
Fig. 8B.

SONAR ARRAY TRANSMISSION RADIATION PATTERN WITHOUT RESISTORS

SONAR ARRAY TRANSMISSION RADIATION PATTERN WITH RESISTORS

SONAR SYSTEM WITH DYNAMIC POWER STEERING

RELATED APPLICATIONS

The current patent application is a regular utility patent application which claims priority benefit, with regard to all common subject matter, to U.S. Provisional Application Ser. No. 63/093,370, filed Oct. 19, 2020, and entitled "FREQUENCY STEERED SONAR ARRAY SYSTEM WITH POWER ADJUSTMENT." The provisional application is incorporated by reference in its entirety into the current patent application.

BACKGROUND

A sonar array system includes one or more sonar arrays that transmit sonar beams which correspond to transmit electronic signals. The sonar array system includes at least two sonar arrays mounted to a hull of a marine vessel that is traveling in a body of water and oriented such that the sonar array can transmit sonar beams in a first direction, such as forward, behind or to a side (port or starboard), and a second (downward) direction in the water. The sonar arrays also output receive electronic signals which correspond to received sonar beam reflections. The sonar array system is typically coupled to a sonar display which processes and converts the receive electronic signals into underwater images that are shown on the display.

SUMMARY

Embodiments of the present technology provide a sonar array system that adjusts power between forward sonar beam transmission and downward sonar beam transmission. The sonar array system comprises a plurality of sonar arrays and a sonar signal processor. Each sonar array is configured to receive transmit electronic signals and transmit corresponding sonar beams into a body of water in a forward direction and a downward direction. Each sonar array includes a plurality of groups of sonar transducer elements, with each group including a first sonar transducer element electrically connected to the first sonar transducer elements of the other groups and a second sonar transducer element electrically connected to the second sonar transducer elements of the other groups. The sonar signal processor is configured to communicate a plurality of transmit electronic signals to the sonar arrays. The transmit electronic signals include a first transmit electronic signal and a second transmit electronic signal. The first transmit electronic signal is received by the first sonar transducer element of each group and includes a periodic waveform having a first phase. The second transmit electronic signal is received by the second sonar transducer element of each group and includes a periodic waveform having a second phase. A distribution of power between the sonar beams transmitted in the forward direction and the sonar beams transmitted in the downward direction varies according to a difference in the first phase and the second phase.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 8A is a diagram of waveforms of the transmit electronic signals illustrating a third phase relationship;

FIG. 8B is a side view of the sonar array system and the marine vessel illustrating the sonar beam power distribution resulting from the third transmit electronic signal phase relationship;

Figure 10A:
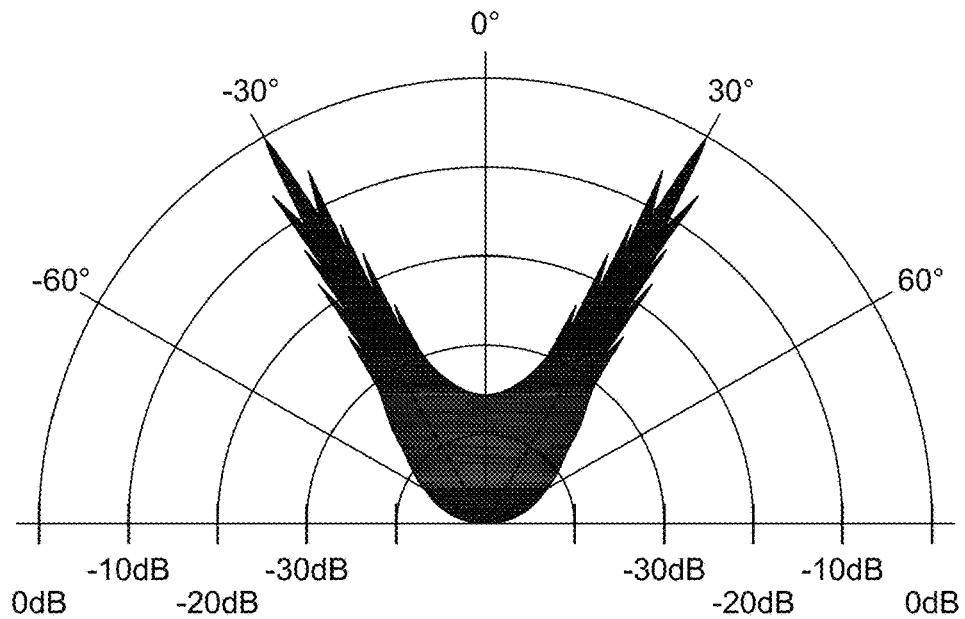
FIG. 10A is a plot of transmission power vs. transmission angle for a sonar array of a prior art sonar array system illustrating enlarged side lobes.
Figure 10B:
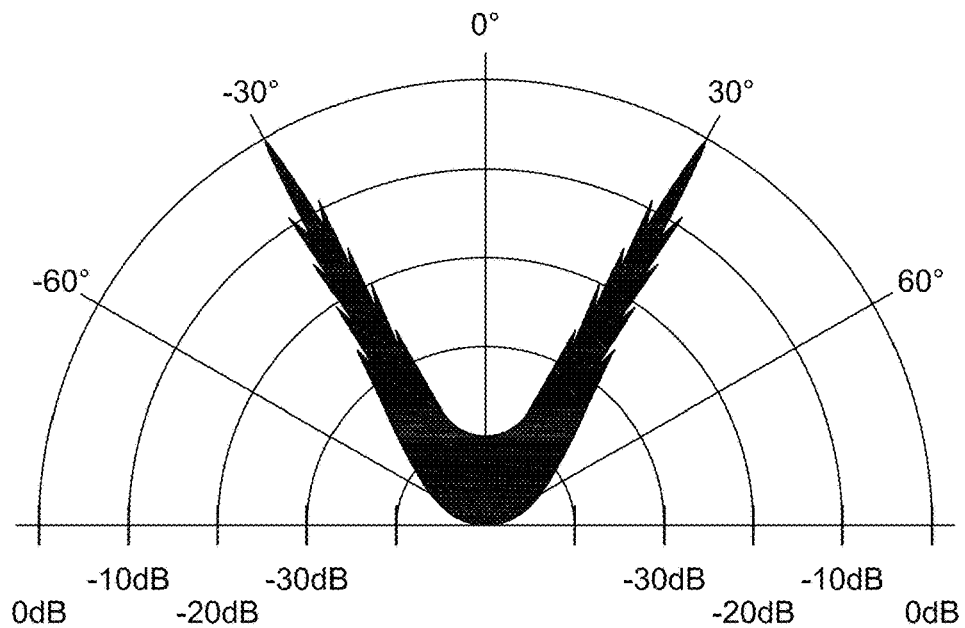
Figure 11:
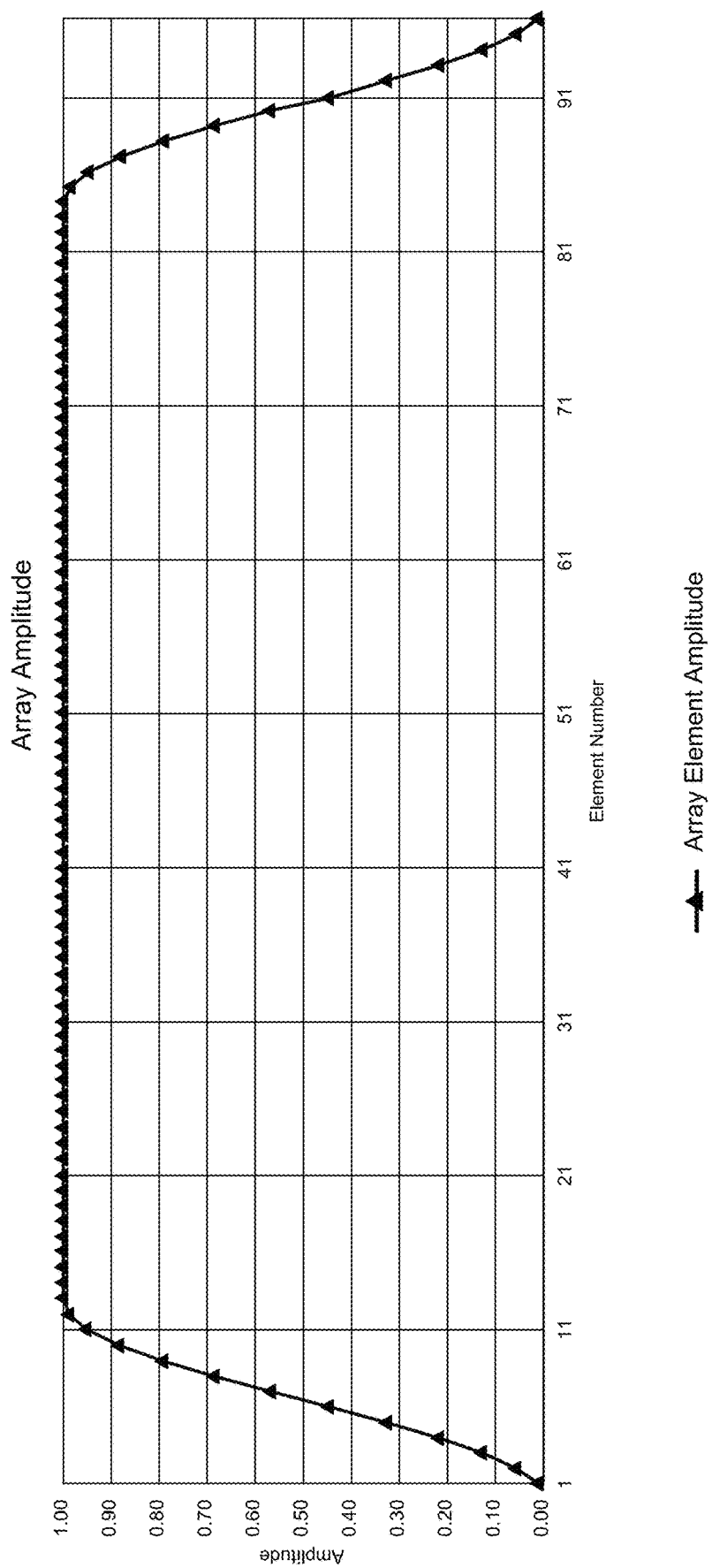

FIG. 10B a plot of transmission power vs. transmission angle for a sonar array of the current technology sonar array system illustrating greatly reduced side lobes; and FIG. 11 a plot of array amplitude for a configuration of three sonar arrays of the sonar array system.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Relational terms, such as "above", "below", "over", "beneath", "upper", "upward", "lower", "downward", "top", "bottom", "outer", "inner", etc., may be used throughout this description. These terms are used with reference to embodiments of the technology and the orientations and relative positionings of the components thereof shown in the accompanying figures. Embodiments of the technology may be oriented and/or positioned in ways other than those shown in the figures. Therefore, the terms do not limit the scope of the present technology.

Embodiments of the present technology relate to a sonar array system with improved operation. The sonar array system is utilized with a marine vessel traveling in a body of water. The sonar array system may comprise one or more sonar arrays, with each sonar array including a plurality of transducer elements that convert transmit electronic signals into corresponding sonar beams output into the body of water. The sonar arrays are mounted on the bottom of a hull of the marine vessel and oriented such that the sonar beams are transmitted in the water beneath the marine vessel in both a first direction, such as forward, backward or to a side (port or starboard), and a second (downward) direction. The sonar arrays may be mounted on the bottom of a hull of the marine vessel such that the forward direction corresponds to the direction of travel (heading) of the marine vessel and the backward (behind) direction is opposite to the direction the travel (heading) of the marine vessel. Reflections of the sonar beams are received from the bed or bottom of the body of water as well as objects present in the water. The transducer elements convert the reflected sonar beams into corresponding receive electronic signals. The sonar array system is typically coupled with a sonar display, which converts the electronic signals into underwater images that are shown on the display.

Figure 9A:
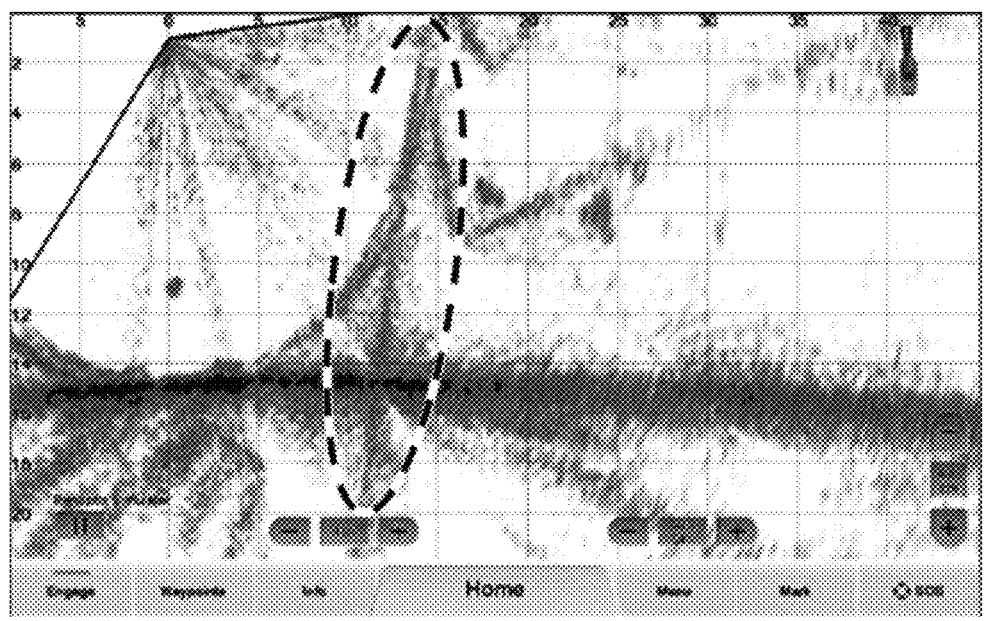
FIG. 9A is a screen capture from a sonar display showing an underwater image from a prior art sonar array system, the underwater image including a plurality of false objects and ghost images.

An example of an underwater image (from a screen capture) generated by a conventional sonar display is shown in FIG. 9A. The underwater image shows a view of the contents of the water beneath the marine vessel (where the generated image is created to appear as if the body of water and objects present in the water are seen from one side of the marine vessel). The screen includes a numbered XY grid, wherein the lines along the X-axis may indicate the distance in front of the sonar array (and the marine vessel) in feet or meters. The lines along the Y-axis indicate the distance below the sonar array (and the marine vessel). It is to be understood that although the units used for the distance in the description of FIG. 9A are expressed in feet, other units of measurement (e.g., meters, yards, etc.) may be also be utilized. The sonar array associated with the image of FIG. 9A is submerged approximately 1 foot under water. Thus, the exemplary underwater image shows the contents of the water up to approximately 40 feet in front of the sonar array and the marine vessel and up to approximately 20 feet below of the sonar array and the marine vessel. The screen also includes bold lines extending forward and downward from the (0 feet, 1 foot) coordinate to provide an indication of the boundaries of the sonar beams. In addition, the display presents user interface buttons and icons associated with various functions. In embodiments, a user may interact with the sonar display by providing touch inputs to the buttons and icons presented on the display. The underwater image includes a diffused horizontal line at approximately 15 feet associated with the bed or bottom of the body of water. The underwater image also shows various objects in the water that may include fish. However, the underwater image further includes depictions of false objects and ghost images that appear as curves and vertical lines which are encircled with a dashed line. The false objects and ghost images presented in such underwater images generated by a conventional sonar display are typically the result of a strong reflection of a downward sonar beam that is increasingly noticeable in shallow water. Although it may be possible that filtering of the electronic signals output by the sonar array may remove the false objects and ghost images, signal filtering may also inadvertently remove actual objects present in the water from the underwater images—meaning that a fisherman looking for a school of fish may not see them on the sonar display even though the fish are present in the receive electronic signals.

In embodiments of the present invention, the sonar array system of the present technology comprises a plurality of sonar arrays and a sonar signal processor that is configured (programmed) to output transmit electronic signals that are received by the sonar arrays. Each sonar array is structured such that it includes a plurality of the transducer elements that are each electrically connected to other transducer elements. For instance, the plurality of transducer elements may be configured to be in one of a plurality of groups of transducer elements. For example, four groups may each consist of a plurality of transducer elements. Thus, in those embodiments, each sonar array receives four transmit electronic signals (one for each group of transducer elements) from the sonar signal processor. As a result, in embodiments where each sonar array includes ninety-six transducer elements, four groups of twenty-four transducer elements each may collectively form the ninety-six transducer elements. In embodiments of the sonar array system having three sonar arrays, two hundred and eighty-eight transducer elements may receive a plurality of transmit electronic signals. The sonar array system may include a sonar signal processor configured to output four transmit electronic signals to each sonar array. In some embodiments, the sonar signal processor may be configured to output twelve transmit electronic signals to three sonar arrays, where each sonar array receives four transmit electronic signals that are different from the transmit electronic signals output to other sonar arrays in the sonar array system.

The transmit electronic signals are periodic in nature. The sonar signal processor varies a phase between at least two of the transmit electronic signals. The sonar signal processor determines a desired phase difference between the at least two transmit electronic signals and maintains the phase difference for a period of time. In certain configurations of the sonar array system, increasing the phase difference between two transmit electronic signals results in a power level of the sonar beam in the first direction (e.g., forward, behind, port or sideboard side, etc.) being greater than a power level of the sonar beam in the second (downward) direction. The power level difference results in a reduction in the false objects and ghost images that may appear in the underwater images on the sonar display due to higher power levels of the downward sonar beam in shallow water. With this improved technology, the sonar signal processor may generate underwater images that more reliably present the targets in and other contents of the water beneath the marine vessel—particularly in shallow water.

Figure 1:
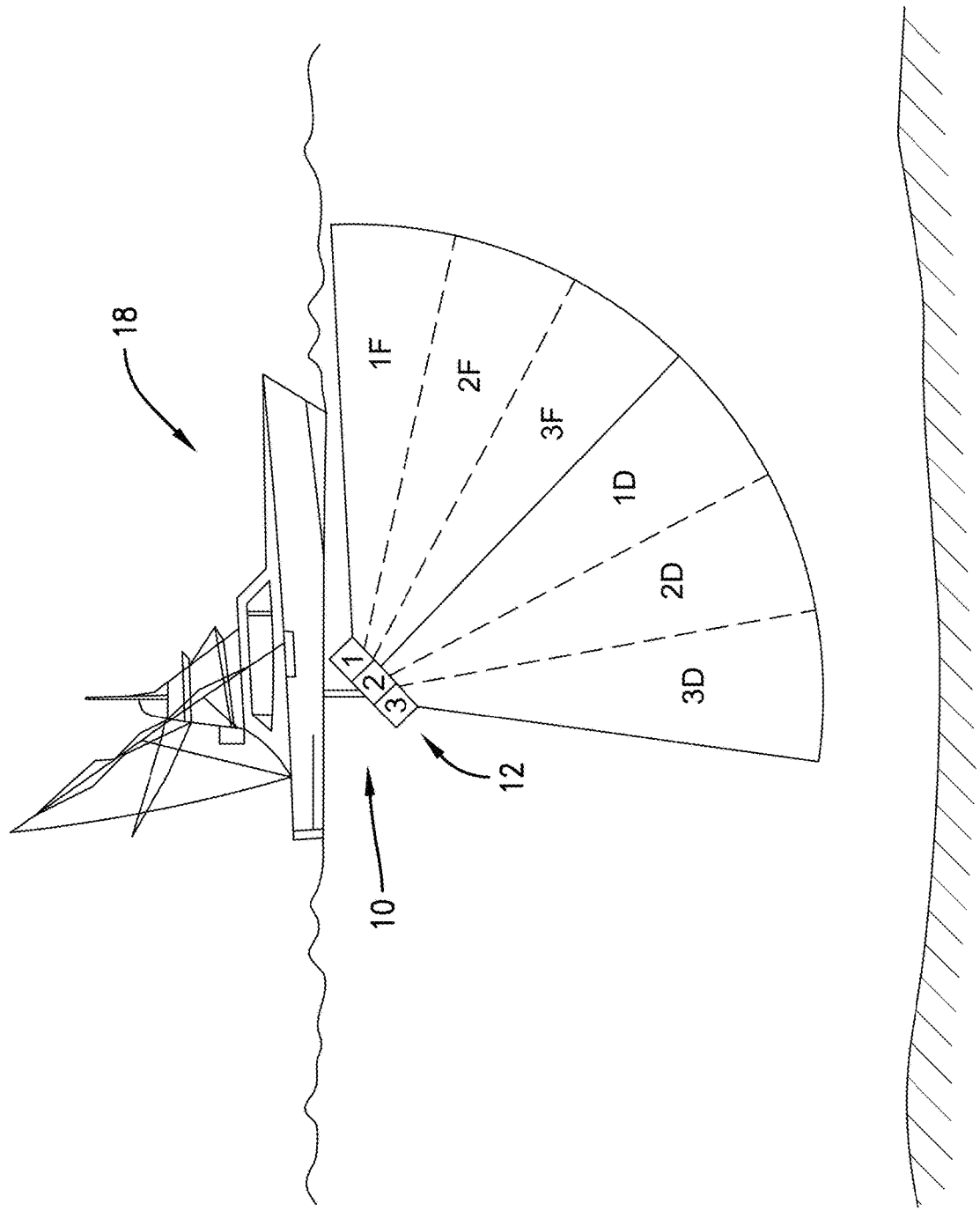
FIG. 1 is a side view of a sonar array system, constructed in accordance with various embodiments of the present technology, the sonar array system coupled to a hull of a marine vessel in a body of water, the sonar array system transmitting a plurality of sonar beams in a forward direction and a downward direction.
Figure 2:
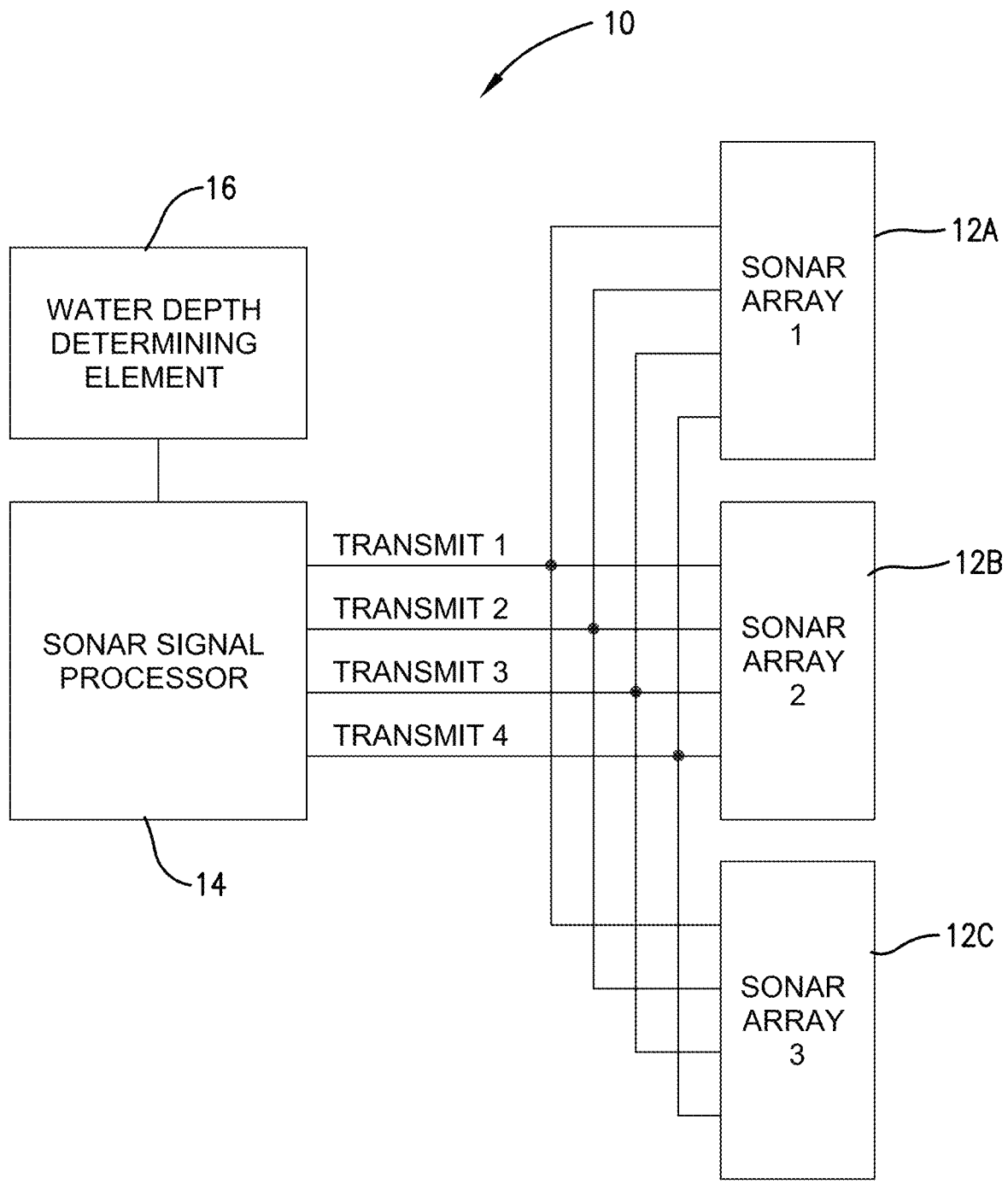
FIG. 2 is a block schematic diagram of various electronic components of the sonar array system.

Embodiments of the technology will now be described in more detail with reference to the drawing figures. Referring initially to FIGS. 1 and 2, a sonar array system 10 that adjusts the phase of a plurality of transmit electronic signals and the power levels of forward sonar beam transmission and downward sonar beam transmission is illustrated. The sonar array system 10, as shown in FIG. 2, broadly comprises a plurality of sonar arrays 12, a sonar signal processor 14 and a memory element. The sonar array system 10 may further comprise, or be in electronic communication with, a water depth determining element 16. The sonar array system 10 may be utilized with, or coupled with, a sonar display which displays images of a content of the water beneath, to the sides, and in front of a marine vessel 18. As discussed in more detail below, the sonar array system 10 is configured to reduce the power level of sonar transmissions in a direction in order to improve the clarity of the underwater images displayed on the sonar display.

The memory element may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 24 may be embedded in, or packaged in the same package as, the processing element 26. The memory element may include, or may constitute, a "computer-readable medium". The memory element may store the instructions, code, code segments, software, firmware, programs, applications, apps, services, daemons, or the like that are executed by the sonar signal processor 14. The memory element may also store settings, data, documents, sound files, photographs, movies, images, databases, and the like.

The water depth determining element 16 generally determines a depth of the body of water in a geographic location of the marine vessel 18. In embodiments, the water depth determining element 16 is integrated within the sonar signal processor 14. In other embodiments, the sonar signal processor 14 is configured to perform the functionality described herein of the water depth determining element 16. The water depth determining element 16 determines a depth of the water at a current geographic location using the receive electronic signals, which correspond to sonar beam reflections received by one or more sonar arrays from the bottom of the body of water, output by the one or more sonar arrays to the water depth determining element 16. In other embodiments, the water depth determining element 16 is electrically coupled with a sonar transducer element that is generally positioned proximate to or on a lower surface of the marine vessel 18 and configured to transmit a conical sonar beam and receive reflections of the sonar beam from the bottom of the body of water. The time period difference between transmission and reception may be utilized to determine the depth of the water at the geographic location. In other embodiments, the water depth determining element 16 may include a memory element with a database, known as a "lookup table", which includes a depth of the water at a plurality of geographic locations. In such embodiments, the water depth determining element 16 may receive a geolocation (latitude and longitude) from the sonar signal processor 14 (or from a global navigation satellite system (GNSS) receiver) and output the associated water depth. In embodiments, the water depth determining element 16 outputs a water depth electronic signal having an analog electric voltage or electric current level or digital data value corresponding to the water depth at the current location of the marine vessel 18.

The sonar arrays 12 may include a first sonar array 12A, a second sonar array 12B, and a third sonar array 12C, as shown in FIGS. 1 and 2. The sonar array system 10 may include a larger number or a smaller number of sonar arrays 12 in other embodiments. The sonar arrays 12 are typically mounted proximate to or on the bottom of a hull of the marine vessel 18 and oriented to direct the sonar beams in two or more directions, such as a first direction in front of the marine vessel 18 and a second direction beneath it.

Figure 3:
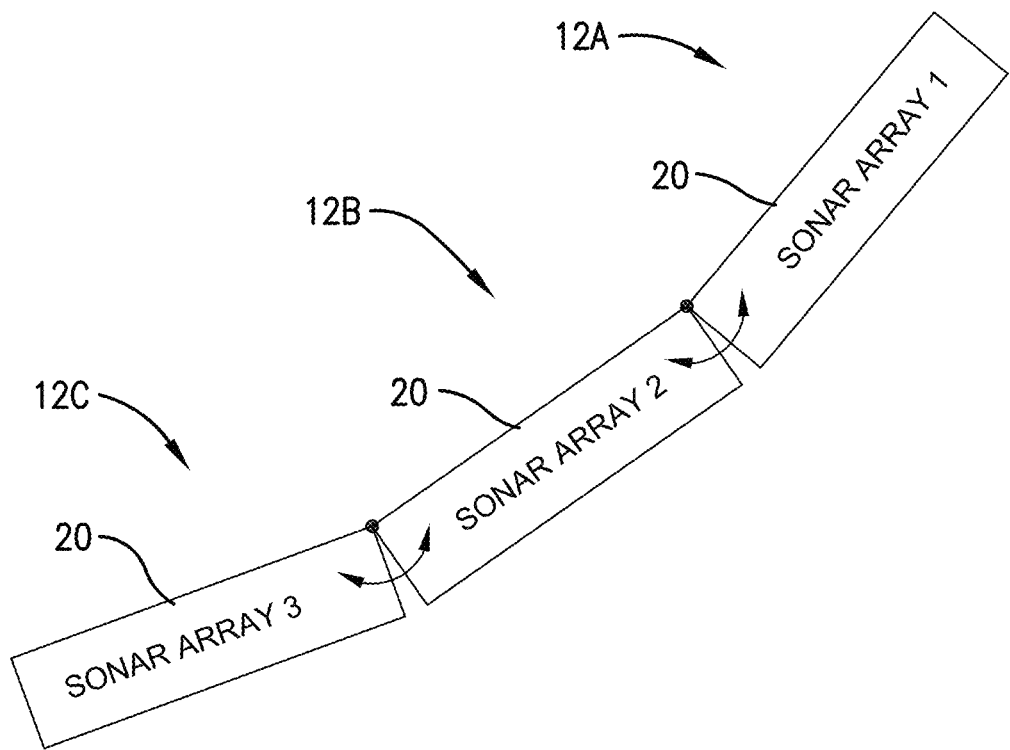
FIG. 3 is a side view of a first configuration of three sonar arrays of the sonar array system.

Each sonar array 12 includes a housing 20 with a top wall, a bottom wall, and four side walls connected to one another to form a box shape. Referring to FIG. 3, in some embodiments, the sonar arrays 12 may be connected to form a sonar array assembly with the first sonar array 12A and the second sonar array 12B being connected to each other and the second sonar array 12B and the third sonar array 12C being connected to each other. The connection between the sonar arrays 12 may be made by an edge between the top wall and one side wall of one sonar array 12 being connected to an edge between the top wall and one side wall of another sonar array 12. Each connection provides rotation so that the first sonar array 12A may rotate relative to the second sonar array 12B and the second sonar array 12B may rotate relative to the third sonar array 12C.

Figure 4A:
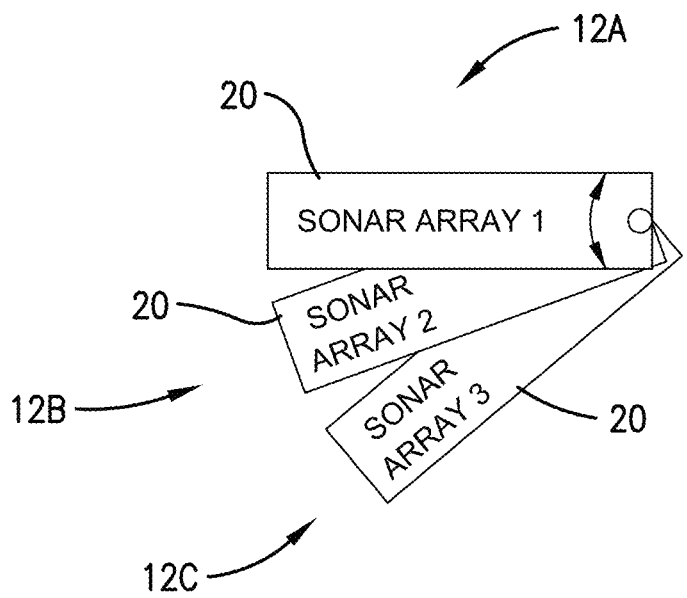
FIG. 4A is a side view of a second configuration of the three sonar arrays.
Figure 4B:
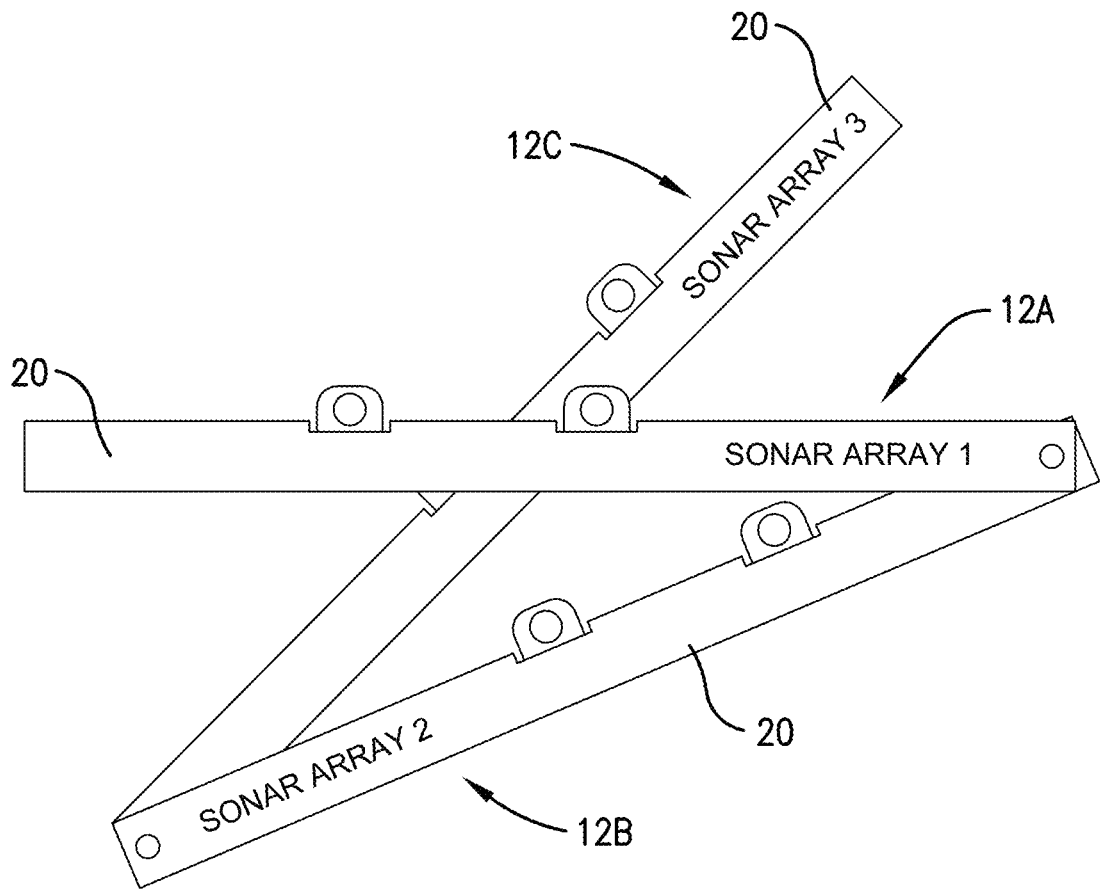
FIG. 4B is a side view of a third configuration of the three sonar arrays.

Referring to FIG. 4A, in other embodiments, the sonar array assembly is formed by a first side wall of the first sonar array 12A being connected to a first side wall of the second sonar array 12B and a second side wall of the second sonar array 12B and being connected to a first side wall of the third sonar array 12C such that the sonar arrays 12 are rotatable relative to one another along an axis near one end of each sonar array 12. Similarly, as shown in FIG. 4B, the sonar array assembly may be formed by a first side wall of the first sonar array 12A being connected to a first side wall of the second sonar array 12B and a second side wall of the second sonar array 12B being connected to a first side wall of the third sonar array 12C such that the sonar arrays 12 are rotatable relative to one another along opposing ends of second sonar array 12B and a center point of first sonar array 12A is aligned with a center point of third sonar array 12C. Each sonar array 12 shown in FIGS. 4A and 4B may include a housing 20 with a top wall, a bottom wall, and four side walls connected to one another to form a hinged or an X-shaped enclosure, respectively.

Figure 5:
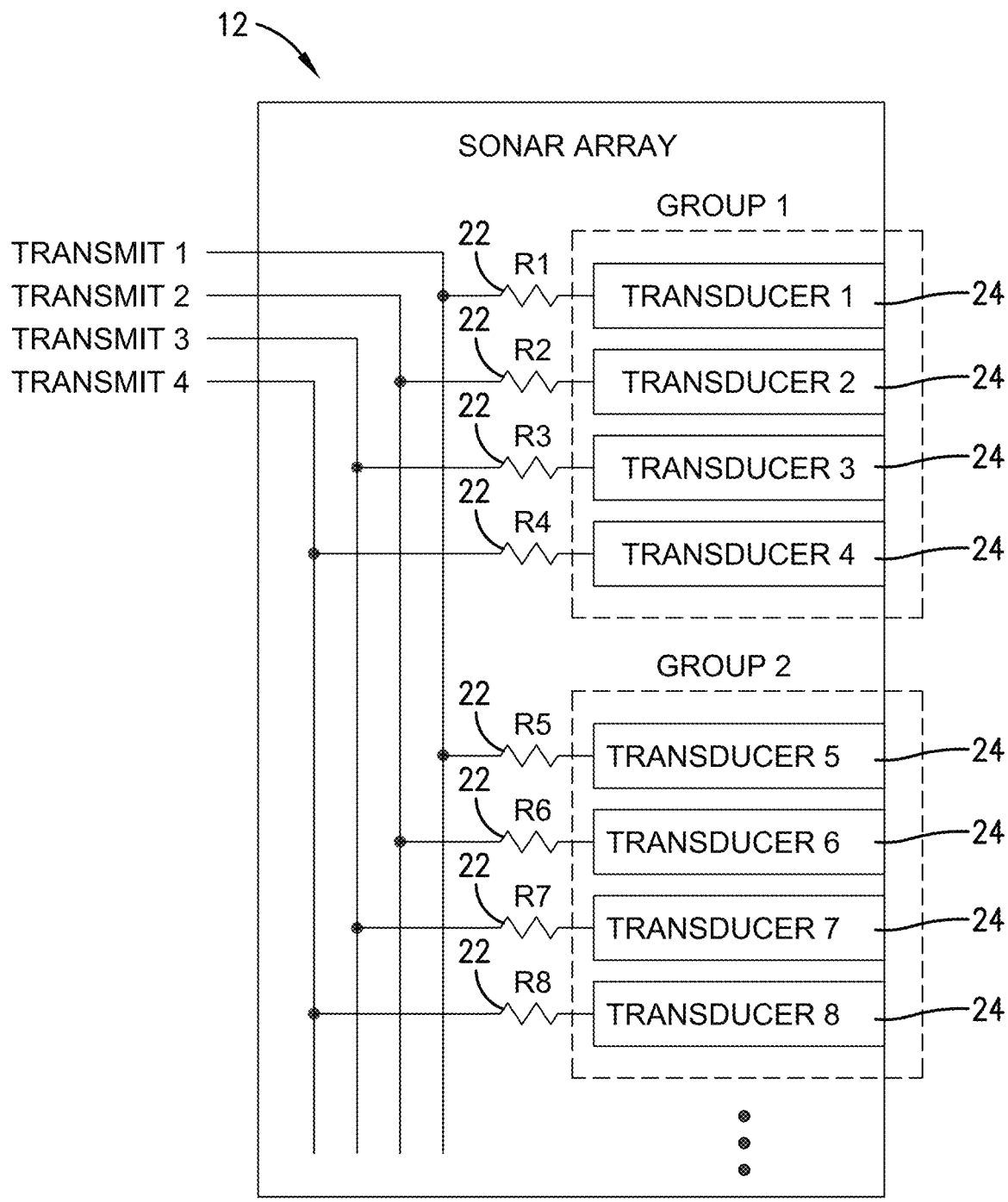
FIG. 5 is a block schematic diagram of various electronic components of one sonar array.

As shown in FIG. 5, each sonar array 12 may include a plurality of resistors 22 and a plurality of transducer elements 24. Each resistor 22 is electrically connected in series with a successive one of the transducer elements 24. In exemplary embodiments, each sonar array 12 may include a number of transducer elements 24 that is a multiple of the number of groups. For example, each sonar array 12 may include ninety-two transducer elements 24 (four groups of each having twenty-three transducer elements 24) and ninety-two resistors 22. Similarly, each sonar array 12 may include ninety-six transducer elements 24 (four groups of each having twenty-four transducer elements 24) and ninety-six resistors 22. The transducer elements 24 are positioned within the housing 20 adjacent to one another. In exemplary embodiments, the transducer elements 24 may be positioned within the housing 20 at a pitch of a quarter wavelength.

Each of the transducer elements 24 is electrically connected to transducer elements 24 in other groups. That is, the individual transducer elements 24 of each group are electrically connected to transducer elements 24 of the other groups that receive the same transmit electronic signal. In exemplary embodiments, the transducer elements 24 are electrically connected to one another in groups of four. Thus, a first transducer element 24 in a first group is electrically connected to the first transducer element 24 in each of the other groups, a second transducer element 24 in the first group is electrically connected to the second transducer element 24 in each of the other groups, a third transducer element 24 in the first group is electrically connected to the third transducer element 24 in each of the other groups and a fourth transducer element 24 in the first group is electrically connected to the fourth transducer element 24 in each of the other groups. As shown in the exemplary embodiment of FIG. 5, transducer element #1 is electrically connected to transducer element #5 and every fourth multiple of transducer element 24 after that, transducer element #2 is electrically connected to transducer element #6 and every fourth multiple of transducer element 24 after that, and so forth. With an electrical connection architecture such as this, each sonar array 12 can transmit sonar beams by receiving four transmit electronic signals, where one of the four transmit electronic signal is transmitted by each transducer element 24.

Each transducer element 24 may be formed from piezoelectric material, like ceramics such as lead zirconate titanate (PZT) or polymers such as polyvinylidene difluoride (PVDF), which transforms electrical energy from one electronic signal into mechanical energy for sonar beams and vice-versa. The transducer elements 24 of each sonar array 12 are configured to transmit sonar beams in at least a forward direction and a downward direction. Referring to FIG. 1, each sonar array 12 transmits a first sonar beam in the forward direction and a spaced-apart second sonar beam in the downward direction. That is, the first sonar array 12A transmits the sonar beam wedges labeled "1F" and "1D," the second sonar array 12B transmits the sonar beam wedges labeled "2F" and "2D," and the third sonar array 12C transmits the sonar beam wedges labeled "3F" and "3D." It is to be understood that the mounting and positioning of the housing 20 of each sonar array 12 determines the direction and angle in which the beams are transmitted into the water. In embodiments, the relative angle of each housing 20 can be adjusted so that adjacent beams provide generally continuous coverage of an underwater region of interest. The distribution of the power between the sonar beams in the forward direction and the sonar beams in the second direction may be the result of a phase difference of the transmit electronic signals, as discussed in more detail below.

The sonar signal processor 14 may comprise one or more processors. The sonar signal processor 14 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. In addition, the sonar signal processor 14 may comprise electronic circuit components such as filters, amplifiers, voltage drivers, digital to analog converters (DACs), analog to digital converters (ADCs), switches, and the like. The sonar signal processor 14 may be configured (programmed) to perform the following functions through hardware, software, firmware, or combinations thereof.

The sonar array system 10 includes a housing enclosing the sonar signal processor 14 and the sonar display. The sonar signal processor 14 is electrically coupled with a plurality of transducer elements 24 of each sonar array 12 and is configured to output transmit electronic signals including a plurality of frequency components. Each transducer element 24 may output a corresponding array of sonar beams into a body of water, where the array of sonar beams forms a sonar wedge. Each sonar beam may have a frequency component determined by one of the frequency components of the transmit electronic signal. Furthermore, each sonar beam may be transmitted in an angular direction that varies according to the frequency component of the sonar beam. When the frequency steered sonar element receives the reflections of the sonar beams, it may generate a receive electronic signal. The receive electronic signal includes a plurality of frequency components, where each frequency component indicates the angular direction from which the reflections of the sonar beams were received.

The sonar signal processor 14 and sonar display may receive the receive electronic signal from each transducer element 24 and the sonar signal processor 14 may calculate an array of sonar data slices and generate an array of sonar image slices, where each sonar image slice includes sonar imagery from the reflections of one of the sonar beams. The sonar display may present the array of sonar image slices in near real time and the array of sonar image slices includes a representation of underwater objects and the water bed that were in the path of the sonar wedge. Each sonar array 12 is operable to transmit sonar beams transmit into the body of water are each transmitted in one of a plurality of angular directions, each angular direction corresponding to one of the frequency components of the transmit electronic signal.

The sonar signal processor 14 may calculate, and store in the memory element, the array of sonar data slices based on the receive electronic signal, where each sonar data slice includes sonar data associated with one of the plurality of frequency components. The sonar signal processor 14 may generate an array of sonar image slices, where each sonar image slice is generated from one of the sonar data slices and includes sonar imagery of a region of the water corresponding to the angular direction of one of the array of sonar beams. The sonar signal processor 14 may then control the sonar display to visually present the array of sonar image slices in near real time. The sonar display may simultaneously display a historical sequence of at least one of the sonar image slices from the array and the historical sequence may be scrolled on the sonar display.

Each transducer element 24 may transmit a sonar beam into a body of water in response to receiving a transmit electronic signal. The transmit electronic signal may include one or more single-ended electronic signals or one or more differential electronic signals. Certain characteristics of the sonar beam, such as a frequency or frequency component, may correspond to similar characteristics of the transmit electronic signal, such that the sonar beam is generated to include the same frequency component as a frequency component of the transmit electronic signal. The transducer element 24 may transmit the sonar beam in an angular direction with respect to the transducer element 24 which varies according to the frequency component of the sonar beam. For example, a first sonar beam with a first frequency component may be transmitted in a first angular direction, while a second sonar beam with a second frequency component may be transmitted in a second angular direction, and so forth.

During operation, each transducer element 24 may receive a transmit electronic signal from sonar signal processor 14 and in turn, may transmit an array of sonar beams. In some implementations, the transmit electronic signal may include a sequence of spaced-apart-in-time pulses, wherein each pulse is an oscillating electrical voltage or electrical current that includes one of a plurality of frequency components. For example, the transmit electronic signal may include a sequence of four pulses, each including a different frequency component. In other implementations, the transmit electronic signal may include at least one broadband pulse that includes a plurality of frequency components. As an example, the broadband pulse may include four frequency components, forty-four frequency components or any other number of frequency components required to smoothly transmit an array of sonar beams in adjacent angular directions to generate accurate sonar display underwater images.

Typically, the frequency components of the transmit electronic signal and, in turn, the sonar beams are chosen such that the generated sonar beams are adjacent to one another and the spacing between the angular directions of the sonar beams ranges from less than 1 degree to approximately 5 degrees. For example, the frequencies may be chosen such that the transducer element 24 transmits a first sonar beam with a first frequency component in an angular direction of 0 degrees (relative to a first angle, such as 20 degrees, measured from a face of the transducer element 24), a second sonar beam with a second frequency component in an angular direction of 4 degrees relative to the first angle, a third sonar beam with a third frequency component in an angular direction of 8 degrees relative to the first angle, and so forth. In other instances, the sonar beams may overlap one another with little spacing between center lines of the main lobes of each beam. Furthermore, it is noted that the listed angular directions are relative and do not represent the absolute angular directions at which the sonar beams would be transmitted into the water. The relationship between the frequency of the sonar beam and the angular direction at which the sonar beam is transmitted may vary according to the construction of the transducer element 24, the components used, the dimensions of the components, the properties of the materials used for the components, and the like.

The process of transducer element 24 receiving the transmit electronic signal and transmitting a corresponding array of sonar beams may be known as a "sweep", a "frequency sweep", a "sonar beam sweep", etc. When a sweep occurs and an array of sonar beams are transmitted in adjacent angular directions, a sonar wedge may be formed which includes the volume in the water covered by the adjacent sonar beams. FIG. 1 illustrates sonar arrays 12A, 12B and 12C transmitting two sonar wedges that are adjacent to one another resulting in substantially continuous coverage of the area in the water below and in front of the vessel. Specifically, sonar arrays 12A, 12B and 12C transmit a first sonar wedge in the forward direction formed by first sonar wedge sections "1F," "2F" and "3F." Similarly, sonar arrays 12A, 12B and 12C transmit a second sonar wedge in the downward direction formed by second sonar wedge sections "1D," "2D" and "3D." Each sonar wedge is formed by a plurality of sonar beams, each transmitted with a different frequency component, such that the plurality of sonar beam angles output by sonar arrays 12A, 12B and 12C collectively form the sonar wedge. The dashed lines in FIG. 1 indicate the virtual boundaries of each portion of the first and second sonar wedges associated with sonar arrays 12A, 12B and 12C.

In addition, the spacing between each sonar wedge may vary. For instance, although FIG. 1 illustrates the first sonar wedge in the forward direction being continuous with and adjacent to the second sonar wedge in the downward direction to provide substantially continuous coverage of the area in the water below and in front of the vessel, it is to be understood that the second sonar wedge may be discontinuous with and separated from the first sonar wedge.

Furthermore, the sonar signal processor 14 may output transmit electronic signals to the sonar arrays 12 to the select an angular width of each sonar wedge. The sonar signal processor 14 may output transmit electronic signals resulting in each sonar wedge having any angular width between 20 and 90 degrees. For instance, as shown in FIG. 1, the angular width of the first sonar wedge and the second sonar wedge is greater than 45 degrees and less than 60 degrees. In some embodiments, sonar array 12A, 12B and 12C may be capable of transmitting either a plurality of sonar wedges having a collective width of approximately 180 degrees.

Each transducer element 24 of each sonar array 12A, 12B and 12C may also receive reflections of the sonar beam bouncing off objects in the water and the water bed. In response, each transducer element 24 may generate a receive electronic signal. The receive electronic signal may include one or more single-ended electronic signals or one or more differential electronic signals. The frequency component of the receive electronic signal is an indication of the angular direction from which the reflections of the sonar beam were received. For example, the receive electronic signal may include a first frequency component which indicates that the reflections of the sonar beam were received from a first angular direction. The receive electronic signal may include a second frequency component which indicates that the reflections of the sonar beam were received from a second angular direction, and so forth. The receive electronic signal may include multiple occurrences of the same frequency component (first, second, third, etc.) separated in time as the result of reflections of the same sonar beam bouncing off of multiple objects in the water located at different distances from sonar arrays 12A, 12B and 12C. If the sonar array 12A, 12B and 12C transmit a sonar wedge, then the receive electronic signal may include the same number of frequency components as were included in the transmit electronic signal which formed the sonar wedge.

The sonar signal processor 14 receives the water depth electronic signal from the water depth determining element 16, which may output the water depth electronic signal indicating a current depth for a geographic location based on an analog electric voltage, electric current level or digital data value. The sonar signal processor 14 generates and communicates a plurality of transmit electronic signals to the sonar arrays 12, as illustrated in FIGS. 2 and 5, and receives and processes a plurality of receive electronic signals from the sonar arrays 12.

In exemplary embodiments, the sonar signal processor 14 outputs four transmit electronic signals. The sonar signal processor 14 may also be configured to output two, three or any other number of transmit electronic signals. As shown in FIG. 5, for each sonar array 12, the first transmit electronic signal is electrically connected to transducer element #1, transducer element #5, and every fourth element thereafter. Similarly, the second transmit electronic signal is electrically connected to the transducer element #2, transducer element #6, and every fourth element thereafter. The third transmit electronic signal is electrically connected to the transducer element #3, transducer element #7, and every fourth element thereafter. The fourth transmit electronic signal is electrically connected to transducer element #4, transducer element #8, and every fourth element thereafter.

The transmit electronic signals are periodic in nature and may be "square wave", sinusoidal, or other periodic waveform shapes, with each transmit electronic signal having a phase associated with its waveform. Thus, the first transmit electronic signal has a first phase, the second transmit electronic signal has a second phase, and so forth. The sonar signal processor 14 may select and separate the phase of at least a portion of the transmit electronic signals with respect to one another in order to control or vary the relative power levels of the sonar beams (e.g., increasing a power level of forward sonar beam relative to the power levels of downward sonar beam). For example, the sonar signal processor 14 may vary or separate the phase between the first transmit electronic signal and the second transmit electronic signal to control or vary the relative powers of the forward sonar beam transmission and the downward sonar beam transmission. In general, the power level of the downward sonar beam transmission is reduced when the second transmit electronic signal has a positive phase shift (as shown in FIGS. 7A and 8A) or a negative phase shift compared to the first transmit electronic signal that is less than or equal to 90 degrees.

Figure 6A:
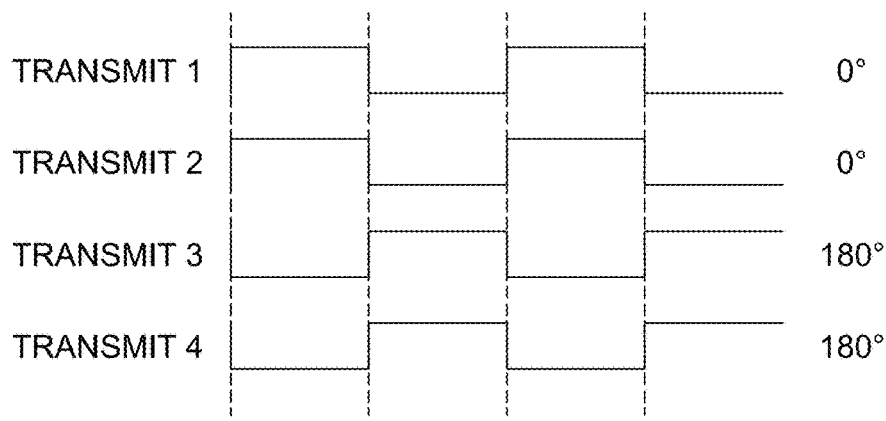
FIG. 6A is a diagram of waveforms of a plurality of transmit electronic signals, the waveforms illustrating a first phase relationship.
Figure 6B:
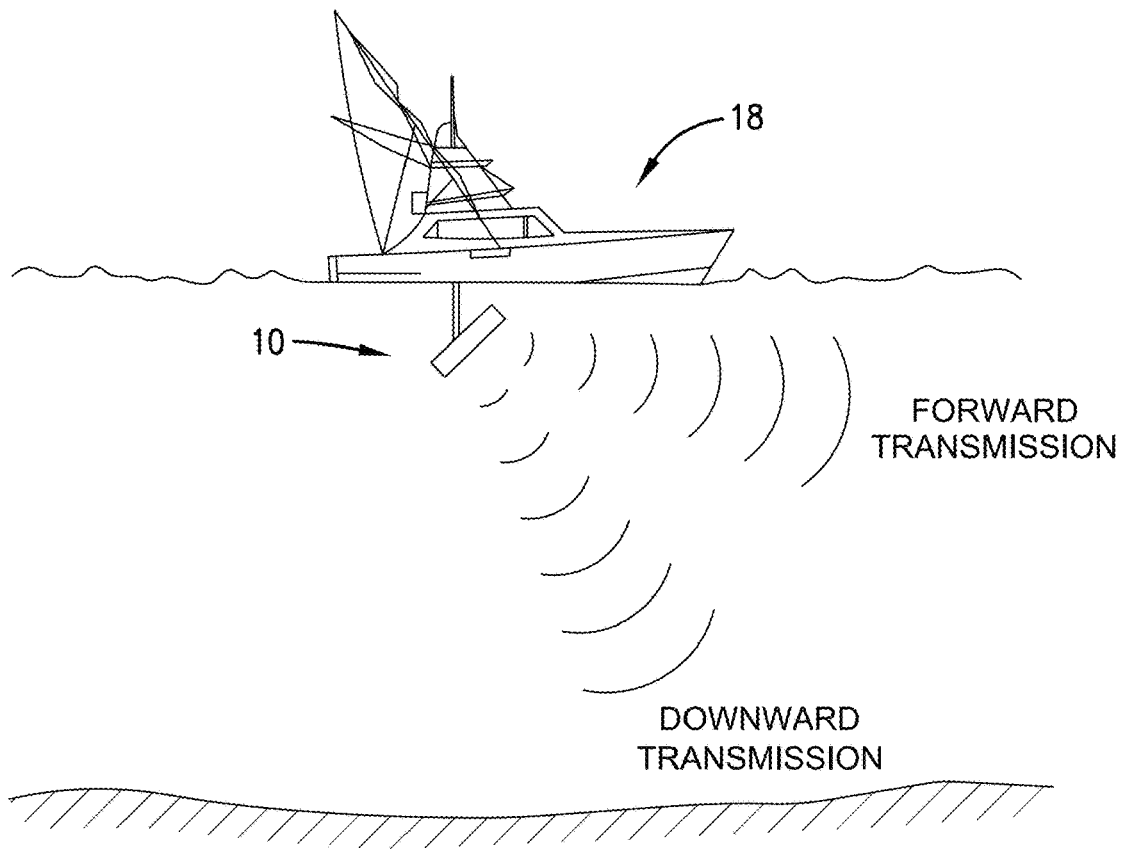
FIG. 6B is a side view of the sonar array system and the marine vessel illustrating the sonar beam power distribution resulting from the first transmit electronic signal phase relationship.
Figure 7A:
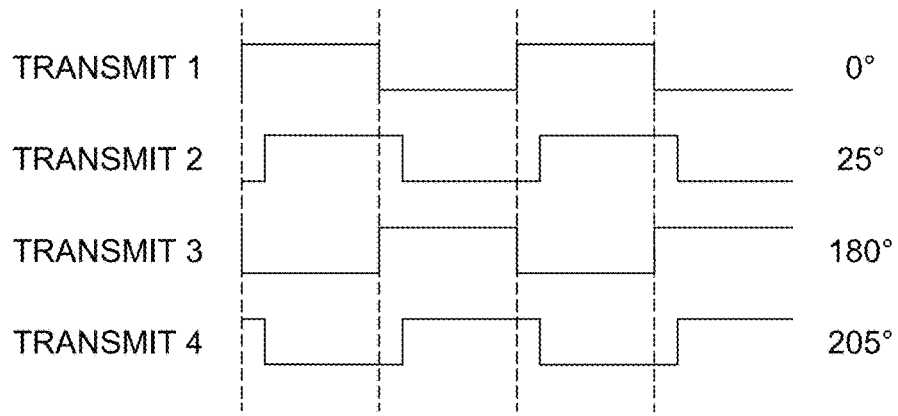
FIG. 7A is a diagram of waveforms of the transmit electronic signals illustrating a second phase relationship.

FIGS. 6A, 6B, 7A, 7B, 8A, and 8B illustrate some examples of sonar signal processor 14 varying or separating the phase between the first transmit electronic signal and the second transmit electronic signal and the result on the relative powers of the forward sonar beam transmission and the downward sonar beam transmission, where the phase of the third transmit electronic signal is 180-degrees offset (inverted) from the first transmit electronic signal and the phase of the fourth transmit electronic signal is 180-degrees offset (inverted) from the second transmit electronic signal, as seen in FIGS. 6A, 7A and 8A. In embodiments where a phase difference between the phase of the first transmit electronic signal and the phase of the second transmit electronic signal is less than or equal to 90 degrees, a phase difference between the phase of the first transmit electronic signal and the phase of the fourth transmit electronic signal is less than or equal to 270 degrees. Since the false objects appearing in sonar display underwater images may be reduced by reducing the power level of the downward sonar beam transmission, the examples are directed to adjustments of the relative phase difference between the first transmit electronic signal and the second transmit electronic signal that reduce the power levels of the downward sonar beam transmission.

Figure 7B:
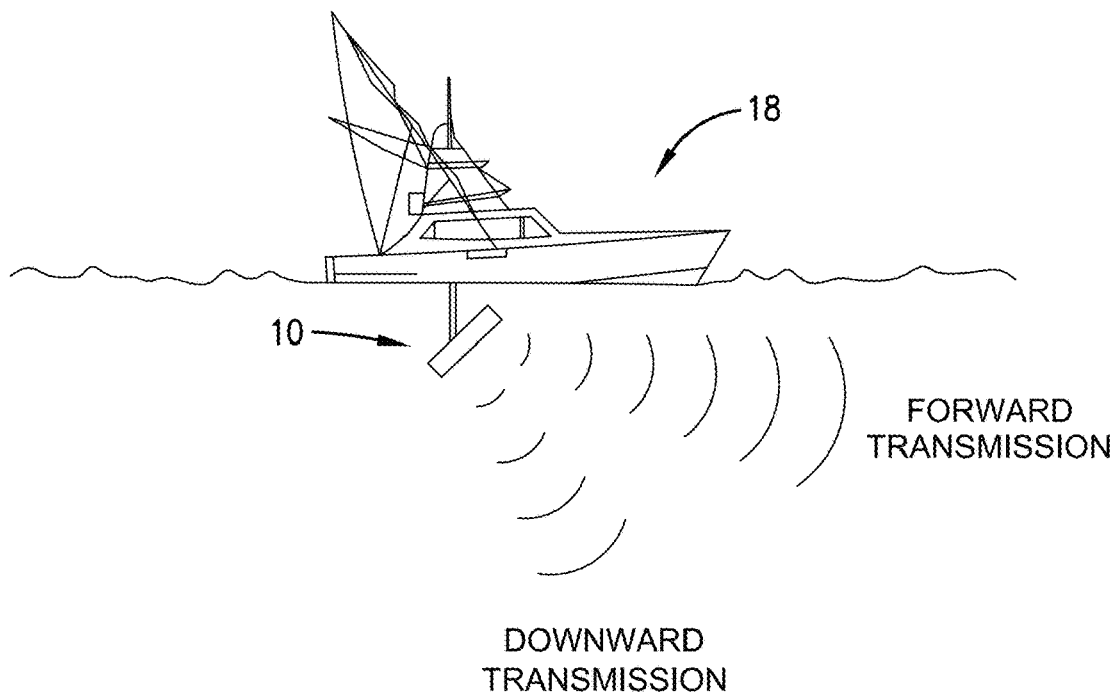
FIG. 7B is a side view of the sonar array system and the marine vessel illustrating the sonar beam power distribution resulting from the second transmit electronic signal phase relationship.

As shown in FIG. 6A, when there is no phase difference between the first transmit electronic signal and the second transmit electronic signal, there is no difference in the power level of sonar beam transmitted in the forward direction and the power level of sonar beam transmitted in the downward direction, as shown in FIG. 6B. The phase of the third transmit electronic signal and the first transmit electronic signal is approximately 180-degrees (inverted) and a phase difference between the fourth transmit electronic signal and the first transmit electronic signal is also approximately 180 degrees. As shown in FIG. 7A, a first positive phase shift of the second transmit electronic signal relative to the first transmit electronic signal results in a first amount of reduced sonar beam power being transmitted in the downward direction, as shown in FIG. 7B (the power level of sonar beam transmitted in the forward direction is greater than the power level of sonar beam transmitted in the downward direction). As shown in FIG. 8A, a second positive phase shift, greater than the first positive phase shift, of the second transmit electronic signal relative to the first transmit electronic signal results in a second amount, greater than the first amount, of reduced sonar beam power being transmitted in the downward direction, as shown in FIG. 8B (the power level of sonar beam transmitted in the forward direction is substantially greater than the power level of sonar beam transmitted in the downward direction).

The sonar signal processor 14, and more broadly, the sonar array system 10, may operate in one of several modes that is selectable by a user. For example, a first mode of operation may not utilize any phase difference between the two transmit electronic signals, a second mode of operation may configure the sonar signal processor 14 to determine the phase difference based on the water depth at a current geographic location and a third mode of operation may configure the sonar signal processor 14 to allow for user selection of the phase difference.

The first mode of operation may be a default mode in which the sonar signal processor 14 outputs the first transmit electronic signal and the second transmit electronic signal with no phase difference between the two transmit electronic signals, as shown in FIG. 6A, resulting in the power levels of the sonar beams in the forward direction and the downward direction being substantially equal.

The second mode of operation may allow the phase offset to selected based on a depth of the water in a current location of the marine vessel 18. For instance, the sonar signal processor 14 may utilize a current water depth to select the phase different between the first transmit electronic signal and the second transmit electronic signal, and thus adjusting the sonar beam power level in the downward direction compared to the sonar beam power level in the forward direction. In general, sonar signal processor 14 may be configured to have a negative correlation between the water depth of the water and the power level of the sonar beam in the downward direction such that the sonar signal processor 14 may increase the power level of sonar beams transmitted in the downward direction as the depth of the water or a depth range increases and decrease the power level of sonar beams transmitted in the downward direction at shallow depths of the water. Broadly speaking, in shallow water, lower power levels of sonar beams may be transmitted in the downward direction, while in deeper water, there may be closer to an even distribution in the power levels of sonar beams transmitted in the forward direction and the downward direction. The depth range is the maximum depth in the underwater image presented on the sonar display. The depth range may be user-configurable or determined by the sonar signal processor 14 based on a current geolocation or depth determinations in other (proximate) areas of the body water. For instance, in FIG. 9B, the depth range is 22 feet, which may be selected by a user or determined by the sonar signal processor 14 based on depth in areas proximate to the boat determined to be roughly between 14 and 16 feet.

In some embodiments, the sonar signal processor 14 may determine and select a phase difference by calculating a desired phase difference as a function of the depth of water. In other embodiments, the sonar signal processor 14 may determine and select the phase difference between the first transmit electronic signal and the second transmit electronic signal through the use of a lookup table stored in the memory element which includes a database with a plurality of water depth values and an associated phase difference for each water depth value.

The third mode of operation may be a user-selectable mode in which the sonar signal processor 14 is configured to allow the user to select the phase difference between the first transmit electronic signal and the second transmit electronic signal for desired power levels of the sonar beam in the downward direction and the sonar beam in the forward direction.

Referring to FIGS. 7A and 7B, thee sonar signal processor 14 has been configured to select a phase difference (shift) between the second transmit electronic signal and the first transmit electronic signal of twenty-five (25) degrees, which results in the power level of the sonar beam in the downward direction being reduced by a first amount (the power level of sonar beam transmitted in the forward direction is greater than the power level of sonar beam transmitted in the downward direction). As shown in FIG. 7A, similar to the embodiment shown in FIG. 6A, the phase difference (shift) between the third transmit electronic signal and the first transmit electronic signal is approximately 180-degrees (inverted) and a phase difference (shift) between the fourth transmit electronic signal and the second transmit electronic signal is also approximately 180-degrees (inverted), which results in a phase difference (shift) between the fourth transmit electronic signal and the first transmit electronic signal being approximately two hundred and five (205) degrees.

Referring to FIGS. 8A and 8B, the sonar signal processor 14 has been configured to select a phase difference (shift) between the second transmit electronic signal and the first transmit electronic signal of fifty (50) degrees, which results in the power level of the sonar beam in the downward direction being reduced by a second amount (the power level of sonar beam transmitted in the forward direction is substantially greater than the power level of sonar beam transmitted in the downward direction). As shown in FIG. 8A, similar to the embodiments shown in FIGS. 6A and 7A, the phase difference (shift) between the third transmit electronic signal and the first transmit electronic signal is approximately 180-degrees (inverted) and a phase difference (shift) between the fourth transmit electronic signal and the second transmit electronic signal is also approximately 180-degrees (inverted), which results in a phase difference (shift) between the fourth transmit electronic signal and the first transmit electronic signal being approximately two hundred and thirty (230) degrees.

Figure 9B:
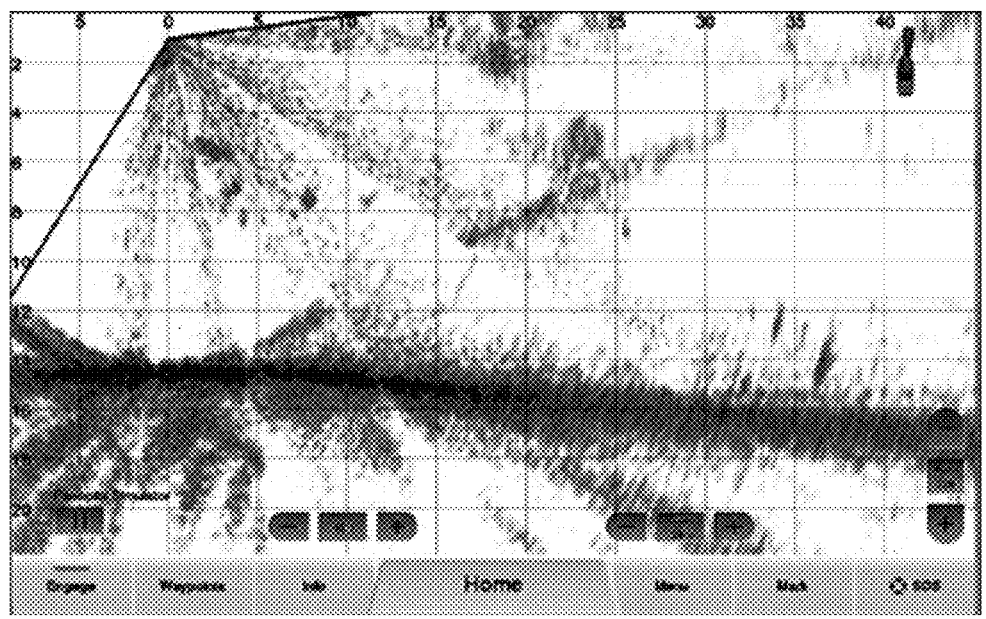
FIG. 9B is a screen capture from the sonar display showing the underwater image from the current technology sonar array system, the underwater image including improved clarity and a greatly reduced number of false objects and ghost images.

Configuration of the sonar signal processor 14 to utilize a phase difference between the first electronic signal and the second transmit electronic signal, including but not limited to operation in the second mode of operation or the third mode of operation, reduces improves images of the underwater environment generated using reflections of the sonar beams and reduces false objects. As shown in FIG. 9B, a screen capture of the sonar display generated using reflections of sonar beams output based on first and second electronic signals having a phase difference selected by sonar signal processor 14 is shown. As compared with the underwater image of the screen capture of FIG. 9A that is generated by a conventional sonar display, the underwater image of FIG. 9B does not include the vertically-oriented lines and curves that are associated with false objects and ghost images that be present in images generated using reflections of sonar beams transmitted at high power levels in the downward direction—particularly in shallow water.

Another benefit of the current technology is illustrated in the plots of FIGS. 10A and 10B. Each plot illustrates a sonar array transmission radiation pattern or the power of the sonar beam transmission vs. rotational angle for each sonar array 12. As shown, the power is primarily directed along two main lobes, with a first lobe oriented at approximately −30 degrees and a second lobe oriented at approximately +30 degrees. The lobes represent sonar beam transmission, wherein, for example, the first lobe may represent sonar beam transmission in the forward direction and the second lobe may represent sonar beam transmission in the downward direction. Sonar arrays 12 that do not include a plurality of resistors 22, with each resistor 22 being electrically connected in series with a successive one of the transducer elements 24, may have sonar array transmission radiation patterns with large side lobes that extend out from the main lobes, as shown in FIG. 10A. Side lobes of high magnitude represent unwanted radiation in undesired directions that adversely impact the quality and accuracy of images generated using sonar beam reflections of narrow main lobe in a desired direction, which may result in degraded image clarity, or blurriness, of the underwater images presented on the sonar display. Adding a resistor 22 in series with a plurality of transducer elements 24 of each sonar array 12 reduces the side lobes and the magnitude at points between the side lobes (such as 0-degrees) of the sonar array transmission radiation pattern, as shown in FIG. 10B, which results in increased clarity of the underwater images on the sonar display.

As shown in FIG. 11, the impedance of certain resistors 22 may be different from the impedance of other resistors 22 to implement amplitude shading for each sonar array 12A, 12B and 12C. For example, the impedance of resistors 22 that are in series with transducer elements 24 positioned on an outer position of sonar array 12A may be higher than an impedance of resistors 22 that are in series with transducer elements 24 positioned in an inner position of the sonar array 12A. A sonar array 12A having ninety-six transducer elements 24 may implement amplitude shading by having twelve transducer elements 24 on each side of sonar array 12A wired in series with resistors 22 (all resistors 22 having the same impedance or some resistors 22 having a higher impedance than other resistors 22) and the seventy-two transducer elements 24 in the center portion of the sonar array 12A may be wired (shorted) directly with other circuitry of the sonar array system 10.

In other embodiments, a sonar array 12A having ninety-six transducer elements 24 may implement amplitude shading by having twelve transducer elements 24 on each side of sonar array 12A wired in series with resistors 22 having a higher impedance than the resistors 22 wired in series with the seventy-two transducer elements 24 in the center portion of the sonar array 12A. Each of the seventy-two transducer elements 24 in the center of sonar array 12A may be wired in series with a resistor 22 having an impedance that is below the impedance(s) of resistors 22 that are in series with transducer elements 24 on an outer position of the sonar array 12A to implement amplitude shading. For instance, the impedance of certain resistors 22 in series with transducer elements 24 on an outer position of the plurality of sonar arrays 12 may be higher than an impedance of resistors 22 in series with transducer elements 24 in an inner position of the plurality of sonar arrays 12. In embodiments having four groups of twenty-four transducer elements 24 (resulting in a sonar array 12 having ninety-six resistors 22 and ninety-six transducer elements 24 in total), each group of twenty-four transducer elements 24 are electrically coupled with each other and each of the ninety-six transducer elements 24 are wired in series with a resistor 22, where twelve transducer elements 24 on each side of each sonar array 12 may have a higher impedance than the seventy-two transducer elements 24 in the center of each sonar array 12. In such a configuration, twelve of the twenty-four transducer elements 24 in the sonar array 12 are electrically coupled with certain resistors 22 having a higher impedance than the resistors 22 electrically coupled with each the seventy-two remaining transducer elements 24 of the sonar array 12.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A sonar array system comprising:
    a plurality of sonar arrays, each sonar array configured to receive transmit electronic signals and transmit corresponding sonar beams into a body of water in a forward direction and a downward direction, each sonar array including a plurality of groups of sonar transducer elements, each group including a first sonar transducer element electrically connected to the first sonar transducer elements of the other groups and a second sonar transducer element electrically connected to the second sonar transducer elements of the other groups; and
    a sonar signal processor configured to communicate a plurality of transmit electronic signals to the sonar arrays, the transmit electronic signals including:
        a first transmit electronic signal to be received by the first sonar transducer element of each group and including a periodic waveform having a first phase, and
        a second transmit electronic signal to be received by the second sonar transducer element of each group and including a periodic waveform having a second phase,
        wherein a distribution of power between the sonar beams transmitted in the forward direction and the sonar beams transmitted in the downward direction varies according to a difference in the first phase and the second phase.

2. The sonar array system of claim 1, wherein
    each group of each sonar array further includes a third sonar transducer element electrically connected to the third sonar transducer elements of the other groups and a fourth sonar transducer element electrically connected to the fourth sonar transducer elements of the other groups, and
    the transmit electronic signals further include
        a third transmit electronic signal to be received by the third sonar transducer element of each group and including a periodic waveform having a third phase that is 180 degrees out of phase with the first phase, and
        a fourth transmit electronic signal to be received by the fourth sonar transducer element of each group and including a periodic waveform having a fourth phase that is 180 degrees out of phase with the second phase.

3. The sonar array system of claim 2, wherein the distribution of power between the sonar beams transmitted in the forward direction and the sonar beams transmitted in the downward direction further varies according to a difference in the third phase and the fourth phase.

4. The sonar array system of claim 1, wherein the second phase has a difference from the first phase of less than or equal to 90 degrees.

5. The sonar array system of claim 2, wherein the fourth phase has a difference from the first phase of between 180 degrees and 270 degrees.

6. The sonar array system of claim 1, wherein the sonar beams transmitted in the downward direction and the sonar beams in the forward direction have a first power level when the second phase is equal to the first phase.

7. The sonar array system of claim 6, wherein the sonar beams transmitted in the downward direction have a second power level when the second phase is different from the first phase, the second power level being less than the first power level.

8. The sonar array system of claim 1, wherein each sonar array further includes a plurality of resistors, with each resistor being electrically connected in series with a successive one of the transducer elements.

9. A sonar array system comprising:
    a plurality of sonar arrays, each sonar array configured to receive transmit electronic signals and transmit corresponding sonar beams into a body of water in a forward direction and a downward direction, each sonar array including a plurality of groups of sonar transducer elements, each group including a first sonar transducer element electrically connected to the first sonar transducer elements of the other groups and a second sonar transducer element electrically connected to the second sonar transducer elements of the other groups; and
    a sonar signal processor configured to communicate a plurality of transmit electronic signals to the sonar arrays, the transmit electronic signals including:
        a first transmit electronic signal to be received by the first sonar transducer element of each group and including a periodic waveform having a first phase, and
        a second transmit electronic signal to be received by the second sonar transducer element of each group and including a periodic waveform having a second phase, the second phase being different from the first phase.

10. The sonar array system of claim 9, wherein a distribution of power between the sonar beams transmitted in the forward direction and the sonar beams transmitted in the downward direction varies according to a difference in the first phase and the second phase.

11. The sonar array system of claim 9, wherein
    each group of each sonar array further includes a third sonar transducer element electrically connected to the third sonar transducer elements of the other groups and a fourth sonar transducer element electrically connected to the fourth sonar transducer elements of the other groups, and the transmit electronic signals further include
- a third transmit electronic signal to be received by the third sonar transducer element of each group and including a periodic waveform having a third phase that is 180 degrees out of phase with the first phase, and
- a fourth transmit electronic signal to be received by the fourth sonar transducer element of each group and including a periodic waveform having a fourth phase that is 180 degrees out of phase with the second phase.

12. The sonar array system of claim 11, wherein the distribution of power between the sonar beams transmitted in the forward direction and the sonar beams transmitted in the downward direction further varies according to a difference in the third phase and the fourth phase.

13. The sonar array system of claim 9, wherein the second phase has a difference from the first phase of less than or equal to 90 degrees.

14. The sonar array system of claim 11, wherein the fourth phase has a difference from the first phase of between 180 degrees and 270 degrees.

15. The sonar array system of claim 9, wherein the sonar beams transmitted in the downward direction and the sonar beams in the forward direction have a first power level when the second phase is equal to the first phase, and wherein the sonar beams transmitted in the downward direction have a second power level when the second phase is different from the first phase, the second power level being less than the first power level.

16. The sonar array system of claim 9, wherein each sonar array further includes a plurality of resistors, with each resistor being electrically connected in series with a successive one of the transducer elements.

17. A sonar array system comprising:
- a memory element;
- a plurality of sonar arrays, each sonar array configured to receive transmit electronic signals and transmit corresponding sonar beams into a body of water, the sonar beams including a first lobe in a forward direction and a second lobe in a downward direction, wherein each sonar array includes:
  - a plurality of groups of sonar transducer elements, each group including a first sonar transducer element electrically connected to the first sonar transducer elements of the other groups and a second sonar transducer element electrically connected to the second sonar transducer elements of the other groups, and
  - a plurality of resistors, with each resistor being electrically connected in series with a successive one of the sonar transducer elements; and
- a sonar signal processor electrically coupled with the memory element and the plurality sonar arrays, the sonar signal processor configured to:
  - communicate a plurality of transmit electronic signals to the sonar arrays, the transmit electronic signals including a first transmit electronic signal to be received by the first sonar transducer element of each group and a second transmit electronic signal to be received by the second sonar transducer element of each group,
  - receive a receive electronic signal from the sonar arrays operable to receive reflections of the sonar beams from the body of water,
  - calculate, and store in the memory element, the array of sonar data slices based on the receive electronic signal, each sonar data slice including sonar data associated with one of the plurality of frequency components,
  - generate an array of sonar image slices, each sonar image slice generated from one of the sonar data slices and including sonar imagery of a region of the water corresponding to the angular direction of one of the array of sonar beams, and
  - control the display to visually present the array of sonar image slices in near real time;
- wherein the sonar beams transmitted into the body of water are each in one of a plurality of angular directions, each angular direction corresponding to one of the frequency components of the transmit electronic signal; and
- wherein the plurality of resistors reduce sidelobes of the first lobe and the second lobe.

18. The sonar array system of claim 17, wherein the plurality of resistors include a first group of resistors and a second group of resistors.

19. The sonar array system of claim 18, wherein each of the resistors in the first group have a first impedance and each of the resistors in the second group have a second impedance, the first impedance being greater than the second impedance.

20. The sonar array system of claim 19, wherein each of the resistors in the first group of resistors are electrically connected in series with a successive one of the sonar transducer elements positioned on an outer portion of the plurality of sonar arrays, and wherein each of the resistors in the second group of resistors are electrically connected in series with a successive one of the sonar transducer elements positioned on an inner portion of the plurality of sonar arrays.

* * * * *